May 22, 1951  B. J. FERRO, JR  2,553,645
QUICK OPENING VALVE

Filed March 11, 1947  2 Sheets-Sheet 1

INVENTOR.
B. J. FERRO
BY Hudson & Young
ATTORNEYS

May 22, 1951     B. J. FERRO, JR     2,553,645
QUICK OPENING VALVE

Filed March 11, 1947     2 Sheets-Sheet 2

INVENTOR.
B. J. FERRO
BY *Hudson & Young*
ATTORNEYS

Patented May 22, 1951

2,553,645

UNITED STATES PATENT OFFICE 2,553,645

QUICK OPENING VALVE

Bernardo J. Ferro, Jr., Bartlesville, Okla., assignor to Phillips Petroleum Company, a corporation of Delaware Application March 11, 1947, Serial No. 733,951

5 Claims. (Cl. 137—152)

1

This invention relates to quick opening valves. In a more specific aspect it relates to valves suitable for compressor suction and discharge valves in which rapid and wide opening and sudden and positive closing are desirable in order to release and to trap as much gas as possible respectively. In another specific aspect it relates to valves having sector holes in the seat and sector shaped valve heads which cover and uncover said holes quickly and positively, rotating in the process to move out of the direct path of flow of the gas from the holes in the seat.

One object is to provide an improved valve.

Another object is to provide a valve with positive action and minimum pressure drop by complete displacement of the valve parts from the path of fluid flow through the valve seat.

Further objects are to provide valves suitable as suction and discharge valves for compressors; valves having sector holes in the valve seat and openings in the valve head that are out of line when the valve is closed but which are in line in the open position of the valve; and to make such valves rugged, cheap, and trouble free, with few and simple parts.

Numerous other objects and advantages will be apparent to those skilled in the art upon studying the accompanying specification, claims and drawings.

In the drawings—

Figure 1:
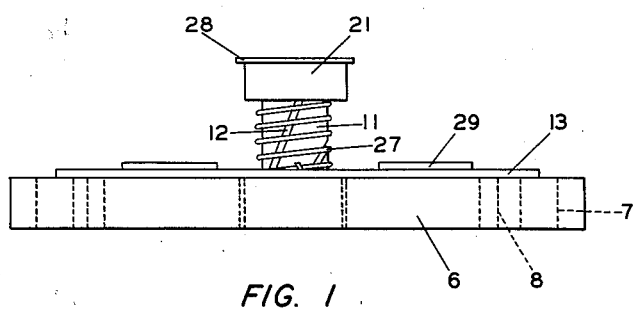
Figure 1 is an elevational view of a valve embodying the present invention.

In Figure 1, the quick closing valve embodying my invention is shown for illustrative purposes as comprising a valve seat 6 in the form of a plate which may be secured across and controlling a passage (not shown) such as the exhaust or intake passages of the cylinder of an air compressor (not shown) by means of bolts (not shown) running through bolt holes 7 in plate 6.

Valve seat 6 is provided with a number of holes 8 providing valve passages. While holes 8 (see Figure 4) may be of various shapes I prefer that holes 8 be made in the form of sectors alternating with solid sector portions 9 of plate 6 having substantially the same sector angle. In practice these sector angles need not be equal as will be

2 pointed out later, but I prefer them to be substantially equal in order to insure free and direct flow as will be explained later.

Secured to plate 6 (or made integral therewith) in a somewhat central position is a screw 11 provided with one or more threads 12. Threads 12 may be grooves as shown or may instead be raised portions relative to 11 and they may be of any width and still operate. However, it is preferred to use four threads 12 as shown and have them relatively narrow grooves in screw 11. The axis of screw 11 is preferably substantially normal to plate 6.

Figure 5:
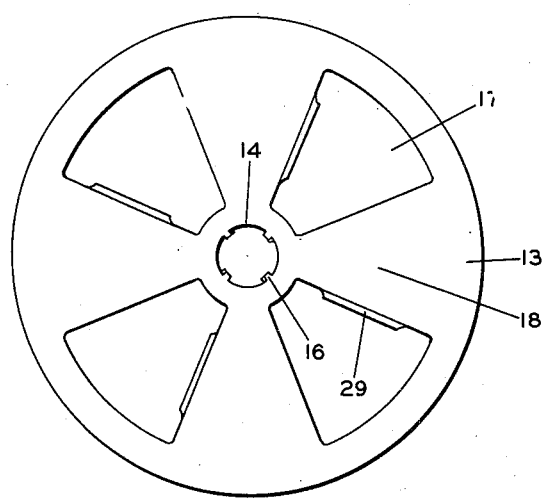
Figure 5 is a plan view of the valve head of Figure 1.

Referring to Figure 5, a valve head 13 is provided having a center hole 14 for the passage of screw 11 and threads 16 or other engaging means for threading in threads 12 of screw 11. While cylindrical pins would do for part 16, I prefer to use a helical thread the same extent as the thickness of plate 13 in order to have a strong structure.

Valve head 13 is provided with sector shaped openings 17 corresponding to openings 8 of plate 6 and intermittent sector shaped solid portions 18 corresponding to parts 9 of plate 6. It will be noted that I have shown all of the sectors as sectors of exactly 45°, and this is suitable for many valve applications. In some valve applications it is desirable to have sectors 18 a little wider in angle than sectors 8 in order to have some overlap to provide a more complete seal when the valve head 13 is closed on valve seat 6. The amount of this overlap can be determined for the particular application by any mechanical engineer and therefore should be considered as present when desirable in this disclosure.

Figure 2:
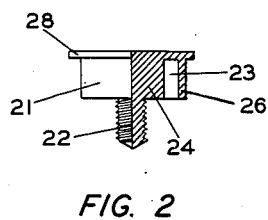
Figure 2 is a quarter-sawed elevational view of the spring hold down of Figure 1.
Figure 3:
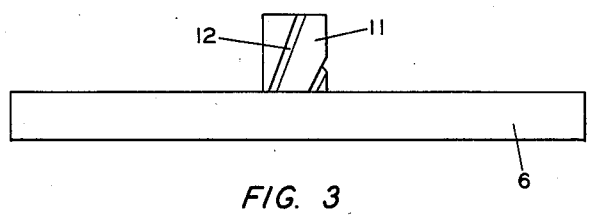
Figure 3 is an elevational view of the valve seat of Figure 1.
Figure 4:
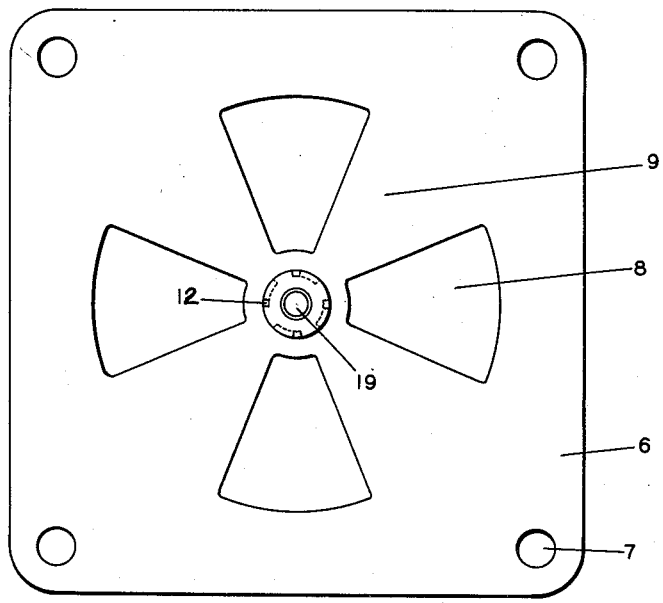
Figure 4 is a plan view of the valve seat of Figure 1.

Screw 11 is provided with a center screw threaded bolt 19, as shown in Figure 4, into which the cap 21, of Figure 2, may be threaded by means of screw 22 which is preferably integral but which may be separable. Cap 21 is preferably provided with a spring recess 23 and its inner portion 24 is preferably made the same diameter as the outer surface of screw 11 so that threads 16 of plate 13 will be checked in their rise; however, if a skirt 26 is provided (as preferred) that skirt will check the rise of plate 13 also. It is preferable to have recess 23 so that spring 27 (Figure 1) will not be subject to complete compression, which lengthens the life of the spring and also allows valve head 13 to be stopped by cap 21 in exactly the right rotational position as will be explained below.

Projecting ridge 28 is provided to aid in the assembly of the device, but may be omitted as suitable frictional engagement may be made with the side surface of cap 21.

As shown in Figures 1 and 5, plate 13 is provided with vanes 29 disposed at an angle to the plane of plate 13 and extending into openings 17. Fluids passing through passage 17 will react with vanes 29 and tend to rotate plate 13, especially when plate 13 is near plate 6.

Operation

When the valve is in the position shown in Figure 1, valve head 13 is against valve seat 6 and valve head sectors 18 are closing valve passages 8 in seat 6. Spring 27 is urging head 13 against seat 6 with the desired degree of force as determined by mechanical engineering. In some instances when the valve is in a suitable position the force of gravity alone is sufficient and spring 27 may be eliminated. Spring 27 can also be eliminated in cases where there is a positive reversal of pressure on both sides of the valve. Obviously valve seat 6 is mounted across and closing the passage (not shown) which is to be controlled by the valve.

In any instance when the pressure of fluid (liquid or gas) below seat 6 and in openings 8 becomes sufficiently greater than the pressure in the fluid above valve head 13, the valve head is pushed away from the seat. As valve head 13 rises on screw 11, threads 16 and 12 cause the head to rotate which uncovers holes 8. As fluid flows through holes 8, it then tends to go through holes 17 and in doing so strikes vanes 29. Vanes 29 are so positioned that the reaction caused by this flow of fluid against them tends to rotate head 13 in a direction causing threads 16 to climb threads 12 and move plate 13 farther away from plate 6.

It is preferred to have the pitch of threads 12 such that plate 13 will rotate just enough before stopped by cap 21 to bring openings 17 and 8 in exact alignment, whereupon fluid rushing through openings 8 will flow directly through opening 17 with a minimum amount of restriction. Obviously some of the fluid is going to pass around the outside of valve head 13, but this is immaterial. When spring 27 is employed it will be compressed in slot 23 when a slot is employed, or otherwise will be compressed around screw 11, in any event the valve parts being designed so that openings 17 and 8 will be aligned when the valve is open.

When the flow of fluid is reversed or the pressure conditions change (considering also the force of gravity and/or spring 27 when spring 27 is present) the valve closes and plate 13 goes through the reverse of the opening process as described above and comes to its seat on plate 6 covering passages 8 with sector portions 18. It will thus be seen that a valve has been provided capable of carrying out all the purposes and objects of the invention as set forth above and as inherent in its structure.

While I have shown in the drawings, several particular illustrative forms of my invention, various modifications may be made in the same and in the various features of construction, without materially changing the invention therein, and formal changes may be made in the specific embodiment of the invention described without departing from the spirit or substance of the broad invention, the scope of which is commensurate with the appended claims. While the valve is shown in a preferred vertical position with gravity aiding closing, it is obvious that for certain uses the valve can be employed on its side, or upside down, either with or without the spring 27.

Having described my invention, I claim:

1. A quick opening valve comprising in combination a valve seat comprising a plate, a screw mounted substantially centrally on said plate with the axis of said screw substantially normal to the plane of said plate, said plate having holes therethrough to provide valve passages, said holes being in the form of sectors, said sectors radiating out from said screw, a valve head threaded on said screw, said valve head having sector portions covering said holes when said valve head contacts said plate, said valve head having parts cut away between said sector portions, means urging said valve head to seat on said plate, and vanes at an angle to said valve head to react with fluid coming through the holes in said plate to force said valve head along said screw away from said plate the pitch of said screw being such that the portions of the head rotate to uncover the holes in the seat to provide a greater flow area than would be obtained by vertical lifting of said head without the rotation of said head on said screw.

2. A quick opening valve comprising in combination a valve seat comprising a plate, a screw mounted substantially centrally on said plate with the axis of said screw substantially normal to the plane of said plate, said plate having holes therethrough to provide valve passages, a valve head threaded on said screw, said valve head having portions covering said holes when said valve head contacts said plate, said valve head having parts cut away between said portions, means urging said valve head to seat on said plate, and vanes at an angle to said valve head to react with fluid coming through the holes in said plate to force said valve head along said screw away from said plate the pitch of said screw being such that the portions of the head rotate to uncover the holes in the seat to provide a greater flow area than would be obtained by vertical lifting of said head without the rotation of said head on said screw.

3. A quick opening valve comprising in combination a valve seat comprising a plate, a screw mounted substantially centrally on said plate with the axis of said screw substantially normal to the plane of said plate, said plate having holes therethrough to provide valve passages, said holes being in the form of sectors, said sectors radiating out from said screw, a valve head threaded on said screw, said valve head having sector portions covering said holes when said valve head contacts said plate, said valve head having parts cut away between said sector portions, and vanes at an angle to said valve head to react with fluid coming through the holes in said plate to force said valve head along said screw away from said plate the pitch of said screw being such that the portions of the head rotate to uncover the holes in the seat to provide a greater flow area than would be obtained by vertical lifting of said head without the rotation of said head on said screw.

4. A quick opening valve comprising in combination a valve seat comprising a plate, a screw mounted substantially centrally on said plate with the axis of said screw substantially normal to the plane of said plate, said plate having holes therethrough to provide valve passages, a valve head threaded on said screw, said valve head having portions covering said holes when said valve head contacts said plate, said valve head having parts cut away between said portions, and vanes at an angle to said valve head to react with fluid coming through the holes in said plate to force said valve head along said screw away from said plate the pitch of said screw being such that the portions of the head rotate to uncover the holes in the seat to provide a greater flow area than would be obtained by vertical lifting of said head without the rotation of said head on said screw.

5. A quick opening valve comprising in combination a valve seat having spaced holes, a valve head movable to and from said seat and having spaced openings, said head covering said holes in said seat when resting on said seat, said openings in said head then being out of line with the holes in said seat, means guiding and rotating said head as said head leaves said seat to align the holes in said seat and the openings in said head whereby flow through said valve is increased by direct flow through the holes in the seat and openings in the head, and a fluid deflecting vane on said head responsive to flow or fluid through the openings in said head creating a force tending to move said head further from said seat the alignment of said means being such that the portions of the head rotate to uncover the holes in the seat to provide a greater flow area than would be obtained by vertical lifting of said head without the rotation.

BERNARDO J. FERRO, JR.

REFERENCES CITED

The following references are of record in the file of this patent:

UNITED STATES PATENTS

| Number | Name | Date |
|---|---|---|
| 322,270 | Engel | July 14, 1885 |
| 851,182 | Rowbotham | Apr. 23, 1907 |
| 1,697,989 | McWane | Jan. 8, 1929 |
| 1,898,244 | Dodrill | Feb. 21, 1933 |
| 1,960,014 | Johnston | May 22, 1934 |
| 2,237,013 | Stanbery | Apr. 1, 1941 |